(12) United States Patent
Mayer et al.

(10) Patent No.: US 11,583,877 B2
(45) Date of Patent: Feb. 21, 2023

(54) SPRAYING DEVICE

(71) Applicant: Bayer CropScience Aktiengesellschaft, Monheim am Rhein (DE)

(72) Inventors: Walter Mayer, Wuppertal (DE); Christof Backhaus, Hückeswagen (DE); Jule Vorholzer, Olsberg (DE); Burak Yardim, Istanbul (TR); Juan Carlos Lagonera, Leverkusen (DE)

(73) Assignee: Bayer CropScience Aktiengesellschaft, Monheim am Rhein (DE)

( * ) Notice: Subject to any disclaimer, the term of this patent is extended or adjusted under 35 U.S.C. 154(b) by 603 days.

(21) Appl. No.: 16/466,564

(22) PCT Filed: Dec. 7, 2017

(86) PCT No.: PCT/EP2017/081820
§ 371 (c)(1),
(2) Date: Jun. 4, 2019

(87) PCT Pub. No.: WO2018/108696
PCT Pub. Date: Jun. 21, 2018

(65) Prior Publication Data
US 2019/0351438 A1 Nov. 21, 2019

(30) Foreign Application Priority Data

Dec. 13, 2016 (EP) ..................................... 16203795
Jan. 16, 2017 (EP) ..................................... 17151595

(51) Int. Cl.
*A01M 7/00* (2006.01)
*B05B 12/00* (2018.01)
*B05B 12/12* (2006.01)
*B05B 9/08* (2006.01)

(52) U.S. Cl.
CPC ........... *B05B 9/085* (2013.01); *A01M 7/0046* (2013.01); *A01M 7/0089* (2013.01); *B05B 12/006* (2013.01); *B05B 12/124* (2013.01); *B05B 12/126* (2013.01)

(58) Field of Classification Search
CPC ..... B05B 9/085; B05B 12/006; B05B 12/124; B05B 12/126; A01M 7/0046; A01M 7/0089
See application file for complete search history.

(56) References Cited

U.S. PATENT DOCUMENTS 4,023,020 A    5/1977 Lestradet
5,897,600 A *  4/1999 Elmore ............... A01M 7/0089
                                                701/34.3

(Continued)

FOREIGN PATENT DOCUMENTS

DE     2447395 B2      7/1980
DE     102013109785 A1 * 3/2015 ........... B05B 12/008

(Continued)

OTHER PUBLICATIONS

International Search Report dated Apr. 5, 2018 for PCT Application No. PCT/EP2017/081820, filed Dec. 7, 2017, 2 pages.

*Primary Examiner* — Joseph A Greenlund
(74) *Attorney, Agent, or Firm* — Morrison & Foerster LLP

(57) ABSTRACT

The invention relates to a device and method for applying a spraying means using a portable spraying device.

14 Claims, 1 Drawing Sheet

(56) References Cited

U.S. PATENT DOCUMENTS

| | | | | |
|---|---|---|---|---|
| 5,911,362 | A * | 6/1999 | Wood | A01M 7/0089 239/161 |
| 7,175,104 | B2 * | 2/2007 | Allen, IV | B05B 12/00 239/152 |
| 10,441,965 | B2 * | 10/2019 | Feldhaus | B05B 1/20 |
| 10,486,179 | B2 * | 11/2019 | Miller | A61M 35/00 |
| 10,940,497 | B2 * | 3/2021 | Gutsmann | B05B 7/32 |
| 2005/0006400 | A1 * | 1/2005 | Shapanus | B05B 9/0861 222/1 |
| 2005/0121462 | A1 * | 6/2005 | Allen | B05B 9/085 222/31 |
| 2006/0261181 | A1 * | 11/2006 | Wirz | A01M 7/0046 239/722 |
| 2013/0037625 | A1 * | 2/2013 | Arenson | A01M 7/0089 239/71 |
| 2015/0296764 | A1 * | 10/2015 | Wirz Luchsinger | A01M 7/0046 239/120 |
| 2016/0000004 | A1 * | 1/2016 | Ni | B05B 12/008 73/204.11 |
| 2016/0044862 | A1 * | 2/2016 | Kocer | A01M 7/0089 111/118 |
| 2016/0368011 | A1 * | 12/2016 | Feldhaus | B05B 12/124 |
| 2017/0225203 | A1 * | 8/2017 | Kloepfer | B08B 3/003 |
| 2018/0169682 | A1 * | 6/2018 | Miller | B05B 17/0607 |
| 2018/0193864 | A1 * | 7/2018 | Plantard | B05B 5/032 |
| 2018/0255696 | A1 * | 9/2018 | Wintemute | A01C 7/10 |
| 2019/0351438 | A1 * | 11/2019 | Mayer | B05B 12/124 |
| 2021/0386050 | A1 * | 12/2021 | Garmendia Oyarbide | A01M 7/0089 |

FOREIGN PATENT DOCUMENTS

| | | |
|---|---|---|
| DE | 102013109785 A1 | 3/2015 |
| EP | 0143588 A2 | 6/1985 |
| EP | 0155850 A2 | 9/1985 |
| EP | 0143588 A3 | 11/1986 |
| EP | 0155850 A3 | 8/1987 |
| EP | 0256744 A1 | 2/1988 |
| WO | WO2017155759 A1 | 9/2017 |

* cited by examiner

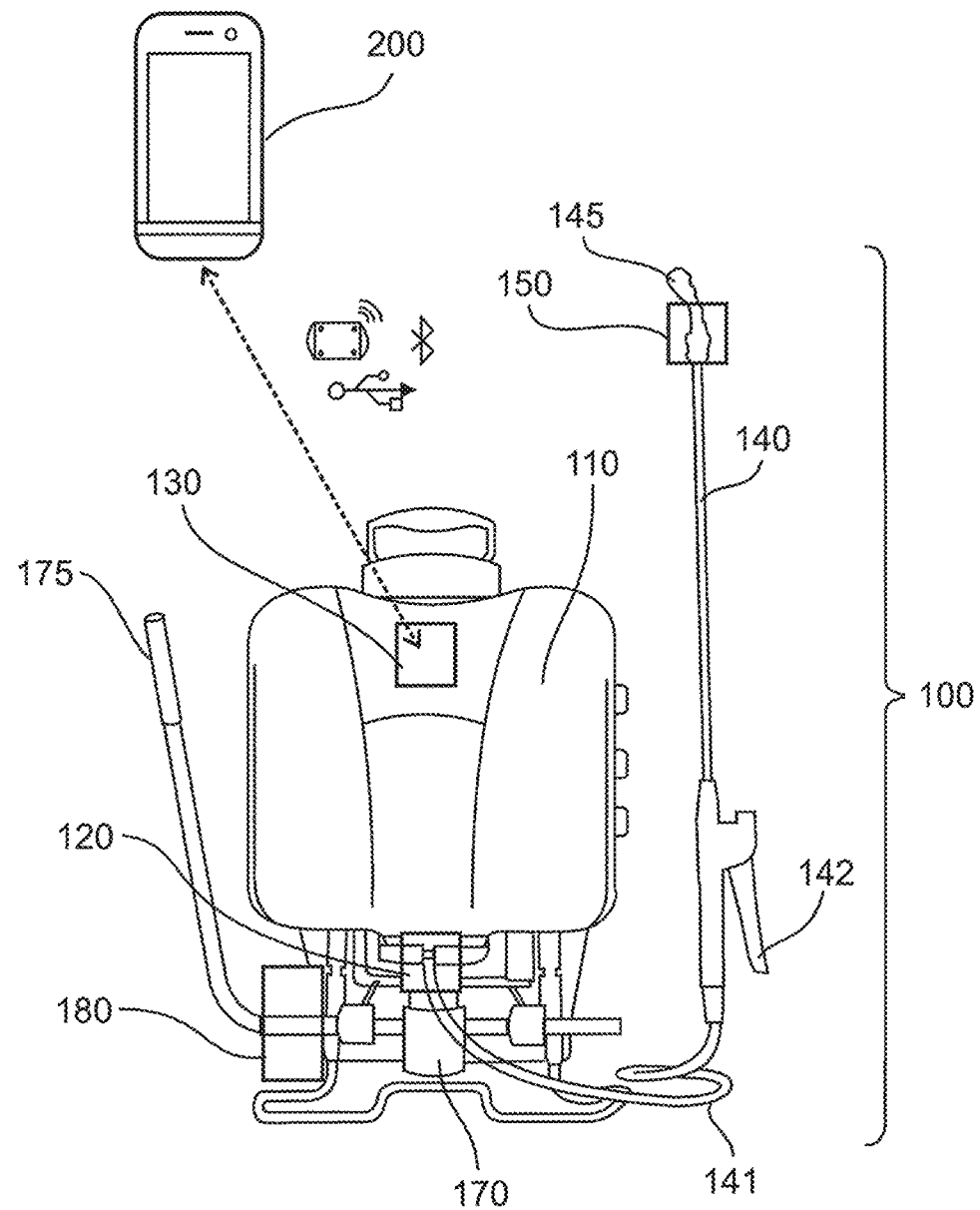

SPRAYING DEVICE

CROSS REFERENCE TO RELATED APPLICATIONS

This application is a national stage application under 35 U.S.C. § 371 of International Application No. PCT/EP2017/081820, filed on Dec. 7, 2017, which claims the benefit of European Application Nos. 16203795.6, filed on Dec. 13, 2016, and 17151595.0, filed on Jan. 16, 2017.

FIELD OF THE DISCLOSURE

The present invention relates to a device and to a method for applying a spraying medium using a portable spraying device.

BRIEF DESCRIPTION OF THE DRAWING

FIG. 1 illustrates a system for applying a spraying medium using a portable spraying device, according to some embodiments.

DETAILED DESCRIPTION

Portable spraying devices are described in the prior art. In particular portable spraying devices are used in agriculture in order to apply crop protection products. Many smallholders use comparatively simple devices which have a container for accommodating the spraying medium and a nozzle holder with one or more nozzles via which the spraying medium can be distributed. A usually hand-operated pump is used to convey the spraying medium from the container through spraying medium lines to the nozzle holder and through the one nozzle or the plurality of nozzles to one or more target objects, while the user is walking through the target area. The application quantity is dependent on the walking speed, the spraying width and the quantity of spraying medium conveyed per unit of time. Since the specified application parameters usually vary during one application process (a person is not a machine), the application quantity is non-uniform over the target area. This can result in too little or too much spraying medium being applied. An excessively small application quantity can result in ineffectiveness of the spraying medium. An excessively large quantity can give rise to unnecessary costs or even damage. The spraying medium is usually composed of a carrier fluid (water) and one or more crop protection products.

The objective of the present invention is to reduce the incorrect behavior of a user when applying a spraying medium onto one or more target objects in a target area with a transportable spraying device, wherein the spraying device should be cost-effective to manufacture and operate and easy to handle, and should be suitable in particular for smallholders.

According to the invention, this object is achieved by means of the subject matters of the independent claims. Preferred embodiments can be found in the dependent claims and in the present description.

A first subject matter of the present invention is therefore a system comprising
    a container for accommodating a spraying medium
    means for the carrying of the container by a user
    at least one nozzle for applying the spraying medium to a target object
    means for conveying the spraying medium from the container through the at least one nozzle in the direction of the target object
    a flow meter for determining the spraying medium flow rate
    a distance sensor for acquiring the spraying distance between the at least one nozzle and the target object
    means for determining the speed of the user
    one or more signal encoders
    means for sensing and evaluating the spraying medium flow rate, the speed of the user and the spraying distance
    means for controlling one or more signal encoders, wherein these means are configured in such a way that they induce the one or more signal encoders to send one or more signals to the user if one or more application parameters deviate from predefined values.

A further subject matter of the present invention is a portable spraying device comprising
    means for the carrying of the spraying device by a user
    a container for accommodating a spraying medium
    at least one nozzle for applying the spraying medium to a target object
    means for conveying the spraying medium from the container through the at least one nozzle in the direction of the target object
    a flow meter for determining the spraying medium flow rate
    a distance sensor for acquiring the spraying distance between the at least one nozzle and the target object
    one or more signal encoders
    wherein the spraying device is configured in such a way that it interacts with a separate mobile computer system in such a way that it transmits the spraying medium flow rate and the spraying distance to the separate mobile computer system, and the separate mobile computer system induces the one or more signal encoders to send one or more signals to the user if the spraying medium flow rate and/or the spraying distance deviate from predefined values.

A further subject matter of the present invention is a computer program product which can be loaded into the main memory of a mobile computer system and induces the mobile computer system there to carry out the following steps:
    receiving a spraying distance between at least one nozzle and one target object from a distance sensor
    receiving a speed of a user
    receiving a spraying medium flow rate from a flow meter
    checking whether the spraying distance, the speed and/or the spraying medium flow rate deviate from predefined values
    inducing one or more signal encoders to output one or more signals to the user in order to induce the user to change the spraying distance, the speed and/or the spraying medium flow rate, with the result that a predefined application quantity of spraying medium is brought about.

A further subject matter of the present invention is a method comprising the steps
    a portable spraying device being moved through a target area by a user
    directing at least one nozzle onto a target object
    conveying a spraying medium from the spraying device through the at least one nozzle onto the target object determining the spraying distance between the at least one nozzle and the target object determining the speed of the user determining the spraying medium flow rate.

The invention will be explained in more detail below, without differentiating between the invention subject matters (system, spraying device, computer program product, method). The following explanations are intended instead to apply in analogous fashion to all the invention subject matters, independently of the context (system, spraying device, computer program product, method) in which they occur.

If steps are specified in a sequence in the description of the method according to the invention, this does not necessarily mean that the steps also have to be carried out in the given sequence. The invention is intended instead to be understood as meaning that the steps which are specified in a sequence can be carried out in any desired sequence or even parallel with one another, unless a step is based on another step, which becomes respectively clear from the description of the steps.

The system according to the invention and the spraying device according to the invention serve for the application of one or more spraying media by a user.

The spraying medium is a fluid which is applied or is intended to be applied to a target object with the spraying device.

The term fluid is to be understood broadly; it is intended to include, for example, not only pure substances and solutions but also suspensions and emulsions.

The spraying medium preferably contains one or more crop protection products and/or one or more nutrients.

The term "crop protection product" is to be understood as meaning a medium which serves to protect plants or plant products against harmful organisms or to prevent their effects, to destroy undesired plants or parts of plants, to inhibit undesired growth of plants or to prevent such growth and/or to influence, in a different way than nutrients, the vital processes of plants (e.g. growth regulators).

Examples of groups of crop protection products are herbicides, fungicides, insecticides and growth regulators.

A crop protection product usually contains an active substance or a plurality of active substances. The term "active substances" denotes substances which have a specific effect in an organism and bring about a specific reaction. A crop protection product usually contains a carrier material for diluting the one or more active substances. In addition, additives such as preservatives, buffers, colorants and the like are conceivable.

Growth regulators serve, for example, to increase the stability in the case of cereals by shortening the length of the stalk (stalk shortener or better referred to as internode shortener), improving the root growth of cuttings, reducing the height of plants by compression in horticulture or preventing the germination of potatoes. These are usually phytohormones or synthetic analogs thereof.

The term "nutrients" is understood to refer to those inorganic and organic compounds from which plants can extract the elements from which their bodies are constructed. These elements themselves are often also referred to as nutrients. Depending on the location of the plant, the nutrients are extracted from the air, water and the ground. These are usually simple inorganic compounds such as water ($H_2O$) and carbon dioxide ($CO_2$) as well as ions such as nitrate ($NO_3^-$), phosphate ($PO_4^{3-}$) and potassium ($K^+$). The availability of the nutrients varies. It depends on the chemical behavior of the nutrient and on the conditions at the location. Since the nutrient elements are required in a specific proportion, the availability of an element usually limits the growth of the plants (executing the Minimum law extensively described by Justus von Liebig). If this element is added, the growth increases. Apart from the core elements of the organic substance (C, O, H, N and P), K, S, Ca, Mg, Mo, Cu, Zn, Fe, B, Mn, Cl, and, in more sophisticated plants, Co and Ni are also essential for life. Various compounds may be present for the individual nutrients, and therefore, for example, nitrogen can be added as nitrate, ammonium or amino acid.

The target area is the spatial region in which one or more target objects are/are to be sprayed with one or more spraying media.

The target object/objects can be one or more plants, one or more regions of a field (e.g. the arable land), walls, paths, roads, rails or other objects. In this context, a target area can also comprise target objects which, during the application, are intended to be treated with different quantities of a spraying medium or with different spraying media.

In one preferred embodiment, the target objects are cultivated plants which are grown in a field. In this case the field is the target area. In a further preferred embodiment, the target object is a piece of arable land on which cultivated plants are or are to be grown.

The term "cultivated plant" is understood to mean a plant which is grown as a useful plant or a decorative plant in a targeted fashion by the intervention of humans.

The term "field" is understood to be a region of the surface of the earth which can be delimited spatially and which is used for agricultural purposes by planting cultivated plants on such a field, and if appropriate supplying said plants with nutrients and harvesting them.

According to the invention, a user with a spraying device moves through a target area (e.g. a field for cultivated plants) and in doing so applies spraying medium to one or more target objects in the target area.

The spraying device according to the invention comprises at least one container for accommodating a spraying medium. The container serves to accommodate, store and/or transport the spraying medium to the target area and/or through the target area.

It is conceivable that the spraying device is configured to apply a plurality of spraying media simultaneously and/or successively. It is conceivable that the spraying medium is composed of two or more components which are combined in the spraying device and/or in the at least one nozzle during a spraying process. It is, for example, conceivable that a component is a concentrate (such as, for example, a crop protection product concentrate), and another component is a diluting agent for the concentrate (such as for example water).

It is conceivable that the spraying device comprises a plurality of containers. In addition it is conceivable that the spraying device comprises a container for accommodating a first spraying medium (e.g. a diluting agent) and additionally comprises means for connecting a second container to a second spraying medium (e.g. a crop protection product concentrate).

The container can be embodied in a pressure-tight fashion so that the container can be subjected to an overpressure (with respect to the atmospheric pressure). The overpressure can be used, for example, to convey the spraying medium from the container.

The container is composed of one or more materials which are not attacked by the spraying medium. The container is preferably at least partially constructed from plastic.

Plastics are known for the fact that they are chemically inert with respect to many substances. They are additionally lightweight, can be processed well and can be converted into virtually any desired shapes.

In one preferred embodiment, the container is a canister made of plastic which comprises a reversibly closable opening via which one or more spraying media can be filled into the container.

The spraying device according to the invention is a portable spraying device. It is transported through a target area by a user. For this purpose, the spraying device has means for it to be carried by a person. At least the container of the spraying device is preferably carried on a person's back. Therefore, the spraying device preferably has belts and/or straps with which the container can be secured on a person's back. Carrying on the back has, inter alia, the advantage that the user can use his hands for other things than carrying the container. However, it is basically also possible for a user to attach the spraying device to a bicycle, a hand cart or some other vehicle, in order to move it through a target area and apply spraying medium. The transportation on the user's body (e.g. on their back) is merely a preferred embodiment. Various possibilities for the drive are conceivable for each of the embodiments. It is therefore possible for the spraying device to be operated, for example, mechanically (muscle force or drive via a wheel) or by means of a motor (electric motor or internal combustion engine).

The spraying device according to the invention also comprises one or more nozzles via which the spraying medium is discharged onto a target object from the spraying device.

A desired spatial distribution of the applied spraying medium can be achieved by means of a nozzle. The nozzle usually converts the fluid which passes through it into droplets with a specific distribution of droplet size, which depends, inter alia, on the pressure of the fluid, on the flow rate of the fluid and the geometry of the nozzle.

The nozzle can preferably be exchanged, with the result that a user can select a nozzle which is adapted to the application and the target object and has a desired distribution of droplet size and spatial distribution of the spraying medium.

The at least one nozzle is attached to a nozzle holder which can be held by the user, preferably in their hand. The nozzle holder can be, for example, in the form of a lance or pistol or can have some other shape. It is preferably embodied in such a way that the user can direct the at least one nozzle onto a target object and apply spraying medium onto the target object. The nozzle holder generally constitutes here at the same time the line from the pump to the one or more nozzles and is usually configured as a spraying lance, wherein the latter is composed of a pipe which is connected to the pump outlet by means of a flexible hose (see also FIG. 1).

The nozzle holder preferably comprises a transverse bar which extends transversely with respect to the direction of movement of the user during the application of the spraying medium and which comprises a plurality of nozzles, preferably two, three, four or more nozzles, which are preferably distributed uniformly over the length of the transverse bar. It is also conceivable for the end of the nozzle holder to be in the shape of a fork or a rake, wherein nozzles are attached to the ends which correspond to the fork tips/rake tips. Further shapes are conceivable. The nozzle holder is usually composed of a plurality of individual parts. It is therefore usually possible to adapt the entire unit of the nozzle holder to the conditions, for example through the use of a transverse bar. Further components can also be integrated or installed in the nozzle holder (for example pressure-limiting valves or filters). In one preferred embodiment, a pressure-regulating valve is connected upstream of the nozzle holder.

The spraying device according to the invention also comprises means for conveying the spraying medium from the container through the at least one nozzle in the direction of the target object. This conveying means is preferably a pump. The pump can be operated electrically or mechanically, preferably manually, by the user. It is also conceivable for the spraying medium to be conveyed out of the container by means of pressure from a compressor or a pressure cartridge.

In one preferred embodiment, the spraying device according to the invention has a hand-operated pump with which the spraying medium can be conveyed out of the container through the at least one nozzle in the direction of the target object.

The spraying device according to the invention comprises a flow meter for determining the quantity of the spraying medium which emerges from the spraying device per unit of time. Quantity is understood to be the volume or the mass depending on the measuring method used.

The flow meter is preferably a continuous flow meter which is attached upstream of the at least one nozzle in the direction of flow. The continuous flow meter is, for example, a magnetic-inductive continuous flow meter, a float-type continuous flow meter, an ultrasonic sound continuous flow meter, a Coriolis mass continuous flow meter, a calorimetric continuous flow meter or a vortex continuous flow meter. However, the use of a measuring orifice or a dynamic pressure probe is also conceivable.

In one preferred embodiment, the continuous flow measurement is performed using a differential pressure sensor.

Details of continuous flow measurement can be obtained, for example, from the following manual: K. W. Bonfig: Technische Durchflussmessung [technical continuous flow measurement], Vulkan-Verlag Essen, $3^{rd}$ Edition, 2002, ISBN 3-8027-2190-X.

The spraying device according to the invention also comprises a distance sensor for acquiring the spraying distance between the at least one nozzle and the target object (nozzle-target object distance). It is preferably attached in the vicinity of the at least one nozzle. The distance sensor preferably operates in a contactless fashion. The distance sensor can be, for example, a laser distance meter or an ultrasonic sound sensor.

The system according to the invention comprises means for determining the speed of the user. In one preferred embodiment, a GPS sensor (GPS=Global Position-determining System) and a timer (or a similar position-determining system), with which the respective location of the user is detected, and the time which passes when the user passes from one location to another location is determined, are used.

In one preferred embodiment, the GPS sensor and the timer are components of a separate mobile computer system, preferably of a smartphone or tablet computer or a smartwatch or a comparable so-called handheld device. In such a case, the means for determining the user's speed are not an integral component of the spraying device but rather the spraying device and the separate mobile computer system are objects which are physically separated from one another and interact according to the invention. In addition to the determination of the speed, further functions of the spraying device can be "exported" to a separate mobile computer system. However, it is also conceivable for one or more computer systems to be integral components of the spraying device.

In another preferred embodiment, the speedometer is a combination of a timer and a pedometer, such as is implemented nowadays in numerous so-called smartwatches, in smartphones or in fitness trackers. After a step length has been determined, the walking speed can be obtained by means of the following formula: the number of steps multiplied by the step length divided by the time which was necessary for the steps. The use of a pedometer is appropriate only if the user can keep his step length constant. For example, it may be the case that the conditions of the ground vary, even in spatial proximity, when different crops are being grown and therefore the cultivation methods vary. It may also be the case that the ground within the target area is uneven and the user consequently has difficulties in keeping his step length constant. When there are different conditions at the individual locations of use (fields) it may therefore be necessary to obtain the step length or walking speed which is specific to these conditions.

The system according to the invention also comprises one or more signal encoders. The at least one signal encoder can be an integral component of the spraying device; likewise it is conceivable that the at least one signal encoder is a component of a separate mobile computer system; however, it is also conceivable that a plurality of signal encoders are present, at least one of which is an integral component of the spraying device, and at least one other is an integral component of a separate mobile computer system.

A signal encoder can be induced to output one or more signals which is/are intended to alert the user to the occurrence of an event or to a specific circumstance. A signal may be an acoustic signal, that is to say a sound and/or a noise which can be perceived by the human ear. A voice message is also a suitable acoustic signal. However, a signal can also be a visual signal, for example an incoming or outgoing or flashing light which can be sensed by the human eye. However, a signal can also be a tactile signal such as, for example, a vibration which can be perceived when the human body is touched.

The system according to the invention also comprises means for sensing and evaluating the data which are produced during a spraying process and which have an influence on the application quantity of spraying medium and/or the distribution thereof in the target area (application parameters). Application parameters are preferably the user's speed, the quantity of the spraying medium which is output via the at least one nozzle per unit of time (spraying medium flow rate) and the distance between the at least one nozzle and the target object. The means for sensing the data are also referred to here as a sensing unit. The means for evaluating the data are also referred to here as an evaluation unit.

The system according to the invention also comprises means for controlling the one or more signal encoders—also referred to below as control means. The control means are configured in such a way that they induce the one or more signal encoders to send one or more signals to the user if one or more application parameters deviate from predefined values.

The sensing unit, the evaluation unit and/or the control unit may be one or more separate units. It is therefore conceivable that the sensing unit, evaluation unit and/or control unit are components of a single computer system which performs the entire signal processing and sensor control. However, it is also conceivable that functionalities of the sensing, evaluation and/or control are distributed over various separate units which can exchange information with one another.

The sensing unit, the evaluation unit and/or the control unit can be one or more microcontrollers and/or a separate mobile computer system such as, for example, a smartphone or a tablet computer or a smartwatch or a comparable handheld device. A combination of one or more microcontrollers, for example, for processing the data obtained by one or more sensors, with a mobile computer system, for example, for actuating the signal encoders is also conceivable.

In one particularly preferred embodiment, a single-board computer such as, for example, a Raspberry Pi or an Arduino or a comparable device is used in order to receive the data generated by the distance sensor, the spraying medium flow rate meter and/or, if appropriate, further sensors and to pass them onto a separate mobile computer system (preferably a smartphone or a tablet computer). The separate mobile computer system preferably has a GPS sensor and a timer with which the user's position and speed can be obtained. The separate mobile computer system receives the sensor data from the single-board computer preferably via Bluetooth or a serial connection such as, for example, USB (Universal Serial Bus), evaluates them together with the user's speed and induces one or more signal encoders to send one or more signals if the application quantity and/or one or more application parameters are outside the defined limits. Further, cable-bound or cableless techniques are also possible for the data connection.

The combination of a portable spraying device with a separate mobile computer system such as a smartphone or another handheld device is particularly advantageous because nowadays many people have such a handheld device and very frequently carry one with them. Therefore, many functionalities of the system according to the invention are preferably performed by the separate mobile computer system, in particular those functionalities which any handheld device (in particular smartphone) nowadays usually has: for example position determination, timing, determination of speed, data acquisition and data evaluation, actuation of signal encoders, outputting of visual, acoustic and/or tactile signals, storage of data and many more.

The spraying device according to the invention preferably has a holder for accommodating the separate mobile computer system which is embodied as a smartphone or tablet computer. The holder serves to reversibly attach the smartphone or tablet computer to the spraying device. The holder is preferably embodied in such a way that the separate mobile computer system can be connected to the energy supply of the spraying device in order to reduce/remove the loading on the accumulator of the separate mobile computer system and/or charge said accumulator. A terminal for a data connection is preferably present, in order to connect the smartphone or the tablet computer indirectly (e.g. via a single-board computer) or directly to one or more sensors on the spraying device.

The system/spraying device according to the invention preferably comprises one or more accumulators for supplying energy.

In one preferred embodiment, the system/spraying device according to the invention comprises one or more generators for generating electrical energy. The at least one generator preferably generates the entire electrical energy which is necessary to use the electrically operated components of the system/spraying device according to the invention.

In one preferred embodiment, the at least one generator comprises one or more solar cells which is/are attached to or on the spraying device. The at least one solar cell is preferably attached to the container.

In a further preferred embodiment, the at least one generator is a direct current generator (dynamo) which is preferably driven by the same lever with which the preferred hand-operated pump is also operated as a conveying means for the spraying medium. If the user pumps spraying medium manually out of the container in the direction of the target object, at the same time the direct current generator is driven and the electrically operated components of the spraying device are supplied with electrical energy and excess energy is fed, if appropriate, into an accumulator which is preferably present.

A combination of a solar cell and direct current generator is also conceivable. Such a combination has the advantage that when the sun is shining it is possible, if appropriate, to dispense with the direct current generator, while when the sky is cloudy and if the quantity of energy which is generated by means of the solar cell is not sufficient, the direct current generator can be used as an additional energy source.

The spraying device according to the invention preferably has, in addition to one or more generators, a store (accumulator) for electrical energy which can store excess energy and where necessary output it to the electrically operated components of the spraying device according to the invention.

The aim of the invention is to minimize the incorrect behavior of a user when applying a defined application quantity. According to the invention, application parameters are therefore acquired and evaluated during the spraying process. The acquisition and evaluation can be used to monitor the spraying process and/or to calibrate the spraying device according to the invention.

The method according to the invention comprises the steps:
- a portable spraying device being moved through a target area by a user
- directing at least one nozzle onto a target object
- conveying a spraying medium from the spraying device through the at least one nozzle onto the target object
- determining the spraying distance between the at least one nozzle and the target object
- determining the speed of the user
- determining the spraying medium flow rate.

The specified steps are preferably carried out in parallel with one another. While the user moves the portable spraying device through a target area and in the process directs at least one nozzle onto a target object, a spraying medium from the spraying device is conveyed through the at least one nozzle onto the target object, and in the process the spraying distance between the at least one nozzle and the target object, the user's speed and the spraying medium flow rate are determined with corresponding sensors.

In one embodiment of the present invention, the method according to the invention is a method for applying a spraying medium to a target object. This method preferably comprises the following steps:
- a portable spraying device containing the spraying medium being moved through a target area by a user who preferably passes through the target area
- directing at least one nozzle onto a target object
- conveying the spraying medium from the spraying device through the at least one nozzle onto the target object
- determining the spraying distance between the at least one nozzle and the target object
- determining the speed of the user
- determining the spraying medium flow rate
- generating one or more signals in the event of one or more application parameters deviating from predefined values.

In this preferred embodiment, the application of a spraying medium is monitored by corresponding sensors. Whenever one or more application parameters deviate from predefined values, one or more signals is/are sent to the user. The deviation of one or more application parameters from predefined values can result in the desired/necessary application quantity not being complied with. The user is alerted to this circumstance by a corresponding signal.

The application quantity is the quantity of spraying medium which is applied per unit of surface area. The quantity can be specified as a volume or mass.

If a constant quantity of spraying medium per unit of time is discharged by the spraying device via the at least one nozzle, the application quantity is thus dependent on how quickly the user moves through the target area while he is applying spraying medium. The faster he moves with a constant spraying medium flow rate and a constant spraying width, the smaller the application quantity. In addition, the application quantity is dependent on the spraying width. The spraying width is the extent, perpendicular to the user's direction of movement, of that piece of surface area which is wetted by the spraying medium during a spraying process. The larger the spraying width with a constant spraying medium flow rate and a constant speed of the user, the smaller the application quantity. The spraying width is usually dependent on the distance of the at least one nozzle from the target object. The spraying width usually becomes larger as the distance increases. When just one nozzle and one target surface area are used as a target object, it is also conceivable that the user makes the nozzle holder, then usually configured as a spraying lance, and at its end the one nozzle, move over the target surface area by means of a type of oscillating movement as he walks forwards, and the spraying width is therefore primarily dependent on the oscillating movement.

In order to achieve an application quantity which is as constant and defined as possible, the user's speed, the spraying medium flow rate and the nozzle-target object distance are sensed during the application process.

It is also conceivable that the user should move the nozzle holder transversely with respect to the walking direction, in order to increase the spraying width. It is, for example, conceivable that the nozzle holder is configured in such a way that the applied spraying medium wets only a narrow surface area (transversely with respect to the walking direction). The spraying width is usually increased by a to and fro movement of the nozzle holder transversely with respect to the walking direction. In one preferred embodiment, the spraying device according to the invention has a sensor for sensing the deflection width of the nozzle holder transversely with respect to the walking direction of the user during the to and fro movement. It is also conceivable that in addition to the deflection width the oscillating frequency and/or the position of the nozzle holder in space are also sensed. Depending on the geometry of the nozzle holder, the spraying width is also influenced by how the nozzle holder is oriented with respect to the direction of movement and with respect to the target object. Corresponding position sensors can be used also to acquire these application parameters.

If the values of one or more of the acquired application parameters change in such a way that a constant and defined application quantity is no longer provided over the entire target area, or a previously defined part of the target area, the control unit induces the at least one signal encoder to output a signal, with the result that the user is informed that one or more application parameters are outside predefined limits and/or that a constant and defined application quantity is no longer provided over the entire target area. The user can then change his behavior in order to reach a constant and defined application quantity again. In this context "constant and defined application quantity" means that the application quantity during the application process moves within defined limits (usually an upper limit and a lower limit).

It is conceivable, for example, that the user moves too slowly or too quickly and the application quantity is too large or too small. The evaluation unit detects, by comparing the user's current speed with a defined speed lower limit or a defined speed upper limit, that the user is moving too slowly or too quickly. The control unit induces at least one signal encoder to output a signal in order to encourage the user to adopt a higher or a lower speed. In this context, the speed lower limit and speed upper limit are automatically or manually set in a way which is specific to the respective use situation. The basis for this is generally calibration of the spraying device which is carried out before the actual application of a spraying medium.

It is, for example, conceivable that the user holds the nozzle holder with the at least one nozzle too high or too low, with the result that the nozzle-target object distance is too large or too small and the application quantity is correspondingly too low or too high. The evaluation unit detects, by comparing the current nozzle-target object distance with a defined nozzle-target object distance upper limit or a defined nozzle-target object distance lower limit, that the user is holding the nozzle holder too high or too low. The control unit induces at least one signal encoder to output a signal in order to encourage the user to adopt a lower or a higher nozzle holder holding position. The lower limit and upper limit of the nozzle-target object distance are specific here and can vary depending on the use situation and nozzle configuration of the spraying device.

In the case of the use of a manually controllable conveying means for conveying the spraying medium from the container in the direction of the target object (e.g. when a hand-operated pump is used), it may also be the case that the spraying medium flow rate is too low or too high. The evaluation unit detects, by comparing the current spraying medium flow rate with a defined spraying medium flow rate lower limit or a defined spraying medium flow rate upper limit, that the spraying medium flow rate is too low or too high. The control unit induces at least one signal encoder to output a signal in order to encourage the user to set a higher or lower spraying medium flow rate.

It is, for example, also conceivable that the user deflects the nozzle holder too far or not far enough through an incorrect to and fro movement and that the application quantity is too small or too large. The evaluation unit detects, by comparing the current deflection width with a defined deflection width upper limit or a defined deflection width lower limit, that the user deflects the nozzle holder too far or not far enough. The control unit induces at least one signal encoder to output a signal in order to encourage the user to adopt a smaller or a larger deflection width.

It is also conceivable that the evaluation unit calculates an application quantity from the acquired parameters and the control unit transmits one or more signals to the user via one or more signal encoders if the application quantity is below a defined application quantity lower limit and/or above a defined application quantity upper limit. In such a case it could be that it is left to the user to determine whether he wishes to obtain the correct application quantity by adapting his speed, adapting the spraying medium flow rate and/or adapting the spraying width (if possible). The user preferably adapts the application quantity by changing his speed and/or the spraying medium flow rate.

The spraying device also possibly has a pressure regulator which, within certain limits defined by the components, can prevent an overpressure and underpressure. As a result, a source of faults can already be excluded from the application. The determination of the spraying medium flow rate is nevertheless appropriate at least for the purpose of calibration but also for the purpose of monitoring.

In one embodiment of the present invention, the user's speed is obtained and the spraying medium flow rate is adapted automatically, by means of a closed-loop and open-loop control unit, to the user's speed in such a way that the application quantity assumes a defined value and/or is within defined limits. The user receives a signal if the spraying distance between the at least one nozzle and a target object is outside defined limits.

The spraying device according to the invention is preferably calibrated before it is used.

In a further embodiment of the present invention, the method according to the invention is a method for calibrating a portable spraying device. This method preferably comprises the following steps:
  the spraying device being moved through a target area by a user
  directing at least one nozzle onto a target object at a defined spraying distance between the at least one nozzle and the target object
  conveying a spraying medium from the spraying device through the at least one nozzle onto the target object
  determining the spraying distance between the at least one nozzle and the target object
  determining the speed of the user
  determining the spraying medium flow rate
  determining the spraying width by measuring the width of the sprayed target object
  calculating a value or a value range for an application-specific parameter on the basis of the determined speed of the user, the spraying medium flow rate and/or the spraying width.

In this preferred embodiment, the first six steps preferably take place in parallel with one another: while the user moves the spraying device through the target area, he directs the at least one nozzle onto the target object at a defined spraying distance and in the process conveys a spraying medium onto the target object, wherein in this context the spraying distance, the user's speed and the spraying medium flow rate are determined by corresponding sensors. In a subsequent step, the spraying width is determined, and in a step which then follows, the value or value range is calculated for an application-specific parameter.

The calibration therefore comprises the determination of application parameters, for example of user-specific parameters. For the purpose of the calibration, the user can be requested to proceed a defined distance with the spraying device according to the invention, preferably within the later target surface area, with a speed which is as constant as possible in order to determine the average speed at which the person is moving. On the one hand, the speed can differ from one person to another, and on the other hand external circumstances such as the condition of the ground, heat, cold, wind, weight of the spraying device and the like can have an influence on the speed. The objective of this calibration can be to obtain the average speed, to be expected for the subsequent application process, of the respective user in the respective target area. For the purpose of calibration, the user can also be requested to proceed a defined distance with the spraying device according to the invention and in the context to hold or to move the nozzle holder, for example, above the ground at a defined distance. The objective of this calibration can be to obtain the nozzle-target object distance which is to be expected for the subsequent application process, to obtain the oscillating frequency of the nozzle holder which is to be expected for the subsequent application process and/or to obtain the deflection width of the nozzle holder which is to be expected for the subsequent application process and therefore the spraying width. For the purpose of calibration, the user can also be requested to proceed a defined distance and in the context to apply a spraying medium by means of manual pumping movements. The objective of this calibration can be to obtain an average spraying medium flow rate which the user generates by means of the pumping movements. In this context, as many measurements as possible are preferably combined.

If the preferably user-specific or user-dependent parameters are obtained, the computer unit can calculate how high other application-specific parameters which determine the application quantity have to be set in order to ensure a defined application quantity. For example, the composition of the spraying medium can be adapted to the user-specific parameters. For example, an optimum concentration of an active substance in a diluting agent can be acquired from the user-specific/user-dependent parameters which are obtained. In this case, the calibration serves for determining the optimum degree of dilution of an active substance in the spraying medium. It is conceivable, for example, that the quantities of active substance and diluting agent which are to be filled into the container in order to permit a planned application to be carried out are displayed to the user, for example, on a display. It is conceivable that when the quantities are calculated the volume of the container and/or the size of the target area are/is taken into account.

However, it is also conceivable that the spraying medium flow rate is/is to be adapted to the user-specific parameters.

In one preferred embodiment, at least part of the calibration comprises determining the spraying width. For this purpose, the user is requested to proceed a defined distance with the spraying device according to the invention and in the context apply spraying medium to the ground. The width of the sprayed surface area is then measured (perpendicularly with respect to the walking direction). The measurement can be carried out using a measuring tape; however, it is also conceivable for the user to take a photograph of the sprayed surface area using a smartphone or a tablet computer or the like, and for a software package to analyze the photograph in order to determine the width of the sprayed area. It is conceivable that for this purpose a reference is positioned on the ground and in addition to the sprayed area the reference on the photograph is also recorded, with the result that the width of the sprayed area can be quantified by comparison with the reference. It is conceivable that the reference is a marker which is provided on the spraying device. The addition of the crop protection product and/or nutrients is preferably not carried out until after the calibration, and on the basis thereof, with the result that only the carrier fluid is discharged during the calibration process.

In one preferred embodiment, the system according to the invention comprises one or more sensors for determining the environmental conditions, such as, for example, air pressure, humidity and/or air temperature, prevailing during a spraying process. It is conceivable in this context that any unfavorable combinations of these environmental conditions lead to a situation in which an acoustic, visual and/or tactile signal are/is sent to the user by means of the one or more signal encoders.

In one preferred embodiment, the computer program according to the invention records, when it is loaded on the mobile computer system which the user is carrying with him during a spraying process, the distance covered by the user through the target area, the quantity of spraying medium which is applied on a location-specific basis and/or, if appropriate, further parameters (date, time, duration, spraying medium used, degree of dilution of the spraying medium, ambient temperature, humidity, user and other parameters). Therefore, the user, or another person, can, for example, track at a later time when and under which conditions which user has applied which quantities of a spraying medium. Likewise, this data can be used to evaluate the success of the application and plan possible later spraying processes.

The invention will be explained below in more detail with reference to an example without wishing to limit the invention to the features described in the example.

FIG. 1 shows a preferred embodiment of the system according to the invention. The system comprises a spraying device (100) according to the invention and a separate mobile computer system (200) which is embodied as a smartphone. The spraying device (100) comprises a container (110) for accommodating a spraying medium. The container (110) is connected to a nozzle holder (140) via a flexible hose (141). The nozzle holder (140) is embodied as a lance, at one end of which a nozzle (145) is present. In addition, the nozzle holder has a gripping lever (142) with which a valve can be opened and closed, in order to start or stop the discharging of spraying medium via the nozzle (145). The spraying medium is conveyed out of the container (110) in the direction of the nozzle (145) by means of a hand-operated pump (170). The pump (170) is operated by means of the lever (175). While the pump (170) is being operated by means of the lever (175), a generator (180) is additionally operated in order to generate electrical energy. A flow meter (120) acquires the quantity of spraying medium conveyed from the container (110) in the direction of the nozzle (145) per unit of time. With a distance sensor (150) it is possible to determine the distance between the nozzle and target object. The sensors are connected to a computer unit (130) (the connections are not shown in the FIGURE). The computer unit (130) can in turn be connected to the mobile computer system (200) (represented by the dashed line). The mobile computer unit has a GPS sensor and a timer with which a user's position and speed can be determined.

The invention claimed is:

1. A system, comprising:
 a container configured to accommodate a spraying medium and be carried by a user;
 at least one nozzle configured to fluidly connect to the container and to apply the spraying medium to a target object, wherein the at least one nozzle is configured to be handheld by the user;
 a pump configured to convey the spraying medium from the container through the at least one nozzle in a direction of the target object;
 a flow meter configured to determine a flow rate of the spraying medium;

a distance sensor housed within the at least one nozzle and configured to acquire a spraying distance between the at least one nozzle and the target object;

one or more sensors configured to determine a speed of the user;

one or more signal encoders; and one or more processors configured to:
- sense and evaluate the flow rate of the spraying medium, the speed of the user, and the spraying distance; and
- upon determining that one or more application parameters deviate from predefined values, induce the one or more signal encoders to send one or more signals to the user to notify the user of the deviation.

2. The system of claim 1, wherein the system is configured to induce one or more signal encoders to send an acoustic, visual, and/or tactile signal to the user if the spraying distance is outside a defined limit.

3. The system of claim 1, wherein the system is configured to induce the one or more signal encoders to send an acoustic, visual, and/or tactile signal to the user if the speed of the user is outside a defined limit.

4. The system of claim 1, wherein the system is configured to induce the one or more signal encoders to send an acoustic, visual, and/or tactile signal to the user if the flow rate of the spraying medium is outside a defined limit.

5. The system of claim 1, wherein the system is configured to automatically adapt the flow rate of the spraying medium to the speed of the user in order to achieve a defined application quantity of the spraying medium.

6. The system of claim 1, wherein the system comprises at least one generator of electrical energy, and wherein the generator makes available electrical energy for supplying at least some of the electrically operated components of the system.

7. The system of claim 1, wherein the pump is configured to be hand-operated, wherein the system comprises a generator of electrical energy, and wherein the generator is configured to be driven while the pump is operating.

8. The system of claim 1, wherein:
the system comprises a portable spraying device and a mobile computer system;
wherein the portable spraying device and the mobile computer system are separate units;
wherein the spraying device is configured to be carried by a user;
wherein the spraying device comprises:
- the container configured to accommodate the spraying medium,
- the at least one nozzle configured to fluidly connect to the container and to apply the spraying medium to the target object,
- the pump configured to convey the spraying medium from the container through the at least one nozzle in the direction of the target object,
- the flow meter configured to determine the flow rate of the spraying medium, and
- the distance sensor configured to acquire the spraying distance between the at least one nozzle and the target object;

and wherein the mobile computer system comprises the one or more sensors configured to determine the speed of the user.

9. A portable spraying device comprising:
a container configured to accommodate a spraying medium;
at least one nozzle configured to fluidly connect to the container and to apply the spraying medium to a target object, wherein the at least one nozzle is configured to be handheld by a user;
a pump configured to convey the spraying medium from the container through the at least one nozzle in a direction of the target object;
a flow meter configured to determine a flow rate of the spraying medium;
a distance sensor housed within the at least one nozzle and configured to acquire a spraying distance between the at least one nozzle and the target object;
one or more signal encoders;
wherein the spraying device is configured to be carried by a user;
wherein the spraying device is configured to interact with a separate mobile computer system to transmit the flow rate of the spraying medium and the spraying distance to the separate mobile computer system; and
wherein the separate mobile computer system is configured to induce the one or more signal encoders to send one or more signals to the user upon determining that the flow rate of the spraying medium and/or the spraying distance deviate from predefined values in order to notify the user of the deviation.

10. The portable spraying device of claim 9, wherein the pump is configured to be hand-operated, wherein the portable spraying device comprises a generator of electrical energy, and wherein the generator is configured to be driven while the pump is operating.

11. A method comprising:
moving a portable spraying device through a target area by a user;
directing at least one nozzle onto a target object, wherein the at least one nozzle is configured to be handheld by the user;
conveying a spraying medium from the spraying device through the at least one nozzle onto the target object;
determining a spraying distance between the at least one nozzle and the target object using a distance sensor housed within the at least one nozzle;
determining a speed of the user;
determining a flow rate of the spraying medium using a flow meter; and
generating one or more signals upon determining that the spraying distance and/or the flow rate of the spraying medium and/or the speed of the user is/are outside defined limits.

12. The method of claim 11, wherein the user controls the flow rate of the spraying medium with a hand-operated pump, and wherein the movement of the pump drives a generator that generates electrical energy for supplying at least some of the electrically operated components of the spraying device.

13. The method of claim 11, comprising calibrating the portable spraying device by:
determining a spraying width by measuring a width of the sprayed target object;
calculating a value or a value range for an application-specific parameter based on the determined speed of the user, the flow rate of the spraying medium, and/or the spraying width.

14. A computer program product configured to be loaded into the main memory of a mobile computer system to induce the computer system to:
receive, from a distance sensor, a spraying distance between at least one nozzle that is configured to be handheld by a user and a target object, wherein the distance sensor is housed within the at least one nozzle;

receive a speed of the user;

receive a flow rate of a spraying medium from a flow meter;

determine whether the spraying distance, the speed of the user, and/or the flow rate of the spraying medium deviate from predefined values; and upon determining that the spraying distance, the speed of the user, and/or the flow rate of the spraying medium deviate from predefined values, induce one or more signal encoders to output one or more signals to a user in order to induce the user to change the spraying distance, the speed, and/or the flow rate of the spraying, wherein the inducing the user results in a predefined application quantity of the spraying medium.

* * * * *